(12) United States Patent
Yasue et al.

(10) Patent No.: US 11,847,445 B2
(45) Date of Patent: Dec. 19, 2023

(54) DETECTING BUSINESS CODE AREAS IN A MAINFRAME APPLICATION

(71) Applicant: INTERNATIONAL BUSINESS MACHINES CORPORATION, Armonk, NY (US)

(72) Inventors: Toshiaki Yasue, Sagamihara (JP); Nobuhiro Hosokawa, Yokohama (JP); Hiroaki Nakamura, Yokohama (JP); Kohichi Ono, Setagaya-ku (JP); Yukiko Hara, Kawasaki (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/543,898

(22) Filed: Dec. 7, 2021

(65) Prior Publication Data
US 2023/0176861 A1  Jun. 8, 2023

(51) Int. Cl.
*G06F 9/44*       (2018.01)
*G06F 8/75*       (2018.01)

(52) U.S. Cl.
CPC ...................... *G06F 8/75* (2013.01)

(58) Field of Classification Search
CPC ........................................................ G06F 8/75
USPC ......................................... 717/123, 154–157
See application file for complete search history.

(56) References Cited

U.S. PATENT DOCUMENTS

| | | | | |
|---|---|---|---|---|
| 7,788,636 | B2* | 8/2010 | Nakamura | G06F 8/10 |
| | | | | 717/109 |
| 8,265,979 | B2* | 9/2012 | Golani | G06Q 10/10 |
| | | | | 705/7.27 |
| 11,307,873 | B2* | 4/2022 | Halpern | G06F 9/4494 |
| 2004/0078785 | A1 | 4/2004 | Dutt et al. | |

(Continued)

FOREIGN PATENT DOCUMENTS

CN          104536898 A       4/2015

OTHER PUBLICATIONS

Abadi et al., "NoCFG: A Lightweight Approach for Sound Call Graph Approximation", May 2021, arXiv, pp. 1-11. (Year: 2021).*

(Continued)

*Primary Examiner* — Ted T. Vo
(74) *Attorney, Agent, or Firm* — Tutunjian & Bitetto, P.C.; Robert Richard Aragona

(57) ABSTRACT

A computer-implemented method for detecting code regions related to specific processes in an application is provided including obtaining a call-graph of an application, each node of the call-graph representing a program in the application and each edge of the call-graph representing a call between programs, detecting merge points in the call-graph where paths from different entry points are merged, dividing the call-graph into sub-call-graphs at the merge points to create a macro-call-graph, each node of the macro-call-graph representing each of the sub-call-graphs, detecting code regions related to specific processes in each program in the application based on variable names corresponding to the specific processes, setting an initial state to each entry point of the sub-call-graphs, and identifying sub-call-graphs related to each specific process by using dataflow analysis with the initial states and the code regions based on entry states of the sub-call-graphs.

20 Claims, 10 Drawing Sheets

(56) References Cited

U.S. PATENT DOCUMENTS

| | | |
|---|---|---|
| 2005/0204340 A1 | 9/2005 | Ruminer et al. |
| 2022/0083536 A1* | 3/2022 | Hogan ................ G06Q 10/109 |

OTHER PUBLICATIONS

Vini Kanvar, "Microservices from Mainframe Applications: Finding Business Functions", May 2021, retrieved from https://medium.com, 11 pages. (Year: 2021).*

Mazlami et al., "Extraction of Microservices from Monolithic Software Architectures", 2017, IEEE, pp. 524-531. (Year: 2017).*

Vidacs et al., "Macro Impact Analysis Using Macro Slicing", 2007, ResearchGate, pp. 230-235. (Year: 2007).*

Nakagoe et al., "Genetic Network Programming with Automatically Generated Variable Size Macro Nodes", 2004, IEEE, pp. 713-719. (Year: 2004).*

Aversano et al., "Business Process Aware Identification of Reusable Software Components", 2018, SCITEPRESS—Science and Technology Publications , pp. 59-68. (Year: 2018).*

Maras et al., "Identifying Code of Individual Features in Client-Side Web Applications", in IEEE Transactions on Software Engineering. Aug. 8, 2013;39(12):1680-97.

Fang et al., "Functional Code Clone Detection with Syntax and Semantics Fusion Learning", in Proceedings of the 29th ACM SIGSOFT International Symposium on Software Testing and Analysis Jul. 18, 2020 (pp. 516-527).

Nguyen et al., "Building Call Graphs for Embedded Client-Side Code in Dynamic Web Applications", in Proceedings of the 22nd ACM SIGSOFT International Symposium on Foundations of Software Engineering Nov. 11, 2014 (pp. 518-529).

Muchnick S., "Advanced compiler design implementation". Morgan kaufmann; Aug. 15, 1997.

Aho, Alfred V., Monica S. Lam, Ravi Sethi, and Jeffrey D. Ullman. "Compilers: Principles, techniques, and tools second edition." (2007).

Mell et al., "The NIST Definition of Cloud Computing", Special Publication 800-145, Sep. 2011, pp. 2-7.

* cited by examiner

DETECTING BUSINESS CODE AREAS IN A MAINFRAME APPLICATION

BACKGROUND

The present invention relates generally to software design and programming, and more specifically, to methods and systems for detecting specific business code areas in a mainframe application. The operation of businesses and enterprises are governed by business rules. These business rules may be created based on government or trade regulations, industry standards, or the policies of the individual business. Therefore, business rules may be generally defined as logical statements or instructions of what to do in different distinct situations. For example, a simple business rule may set forth that for each Internet sale, a copy of the transaction must be mailed to the customer. A more complicated business rule may involve the processing of a loan. As a result, the overall operation of an enterprise may be based upon hundreds, if not thousands of business rules.

For mainframe applications, when applying a change to a business rule, it often happens that only the source code (business code) for the rule is updated and the document to define the rule is not updated because of cost reduction. As a result, those documents become obsolete and the source code becomes the only master artifact to describe the latest business rules. With such repeated updates, the source code becomes harder to understand, that is, where and how each business rule is implemented, as the business process in the source code is not changed when adding a new function or when modifying the existing business rules. In view of the recent emerging demand for mainframe application modernization, this issue becomes important.

SUMMARY

In accordance with an embodiment, a computer-implemented method for detecting code regions related to specific processes in an application is provided. The computer-implemented method includes obtaining a call-graph of an application, each node of the call-graph representing a program in the application and each edge of the call-graph representing a call between programs, detecting merge points in the call-graph where paths from different entry points are merged, dividing the call-graph into sub-call-graphs at the merge points to create a macro-call-graph, each node of the macro-call-graph representing each of the sub-call-graphs, detecting code regions related to specific processes in each program in the application based on variable names corresponding to the specific processes, setting an initial state to each entry point of the sub-call-graphs and identifying sub-call-graphs related to each specific process by using dataflow analysis with the initial states and the code regions based on entry states of the sub-call-graphs.

In accordance with another embodiment, a computer program product for detecting code regions related to specific processes in an application is provided. The computer program product includes a computer readable storage medium having program instructions embodied therewith, the program instructions executable by a computer to cause the computer to obtain a call-graph of an application, each node of the call-graph representing a program in the application and each edge of the call-graph representing a call between programs, detect merge points in the call-graph where paths from different entry points are merged, divide the call-graph into sub-call-graphs at the merge points to create a macro-call-graph, each node of the macro-call-graph representing each of the sub-call-graphs, detect code regions related to specific processes in each program in the application based on variable names corresponding to the specific processes, set an initial state to each entry point of the sub-call-graphs, and identify sub-call-graphs related to each specific process by using dataflow analysis with the initial states and the code regions based on entry states of the sub-call-graphs.

In accordance with yet another embodiment, a system for detecting code regions related to specific processes in an application is provided. The system includes a memory and one or more processors in communication with the memory configured to obtain a call-graph of an application, each node of the call-graph representing a program in the application and each edge of the call-graph representing a call between programs, detect merge points in the call-graph where paths from different entry points are merged, divide the call-graph into sub-call-graphs at the merge points to create a macro-call-graph, each node of the macro-call-graph representing each of the sub-call-graphs, detect code regions related to specific processes in each program in the application based on variable names corresponding to the specific processes, set an initial state to each entry point of the sub-call-graphs, and identify sub-call-graphs related to each specific process by using dataflow analysis with the initial states and the code regions based on entry states of the sub-call-graphs.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Embodiments in accordance with the present invention provide methods and devices for detecting a code region of a business process corresponding to each specific business rule.

A business rule defines or constrains some aspect of business and always resolves to either true or false. Business rules are intended to assert business structure or to control or influence the behavior of the business. Business rules describe the operations, definitions and constraints that apply to an organization. Business rules can apply to people, processes, corporate behavior and computing systems in an organization, and are put in place to help the organization achieve its goals. While a business rule may be informal or even unwritten, documenting the rules clearly and making sure that they don't conflict is a valuable activity. When carefully managed, rules can be used to help the organization to better achieve goals, remove obstacles to market growth, reduce costly mistakes, improve communication, comply with legal requirements, and increase customer loyalty.

Business rules tell an organization what it can do in detail, while strategy tells it how to focus the business at a macro level to optimize results. A strategy provides high-level direction about what an organization should do. Business rules provide detailed guidance about how a strategy can be translated to action. Business rules exist for an organization whether or not they are ever written down, talked about or even part of the organization's consciousness.

The exemplary embodiments of the present invention detect a code region of a business process corresponding to each specific business rule. In particular, the exemplary embodiments detect the code region of a business process corresponding to each specific business rule by dividing the program call-graph for the target application into multiple sub-call-graphs at all the merge points from any entry points, and create a macro call graph based where each node represents a sub-call-graph, generating the initial state of all the entry points and the statements related to the specific business processes from the given information, detecting the code region for each business process by using dataflow analysis applied on each program, each sub-call-graph, and the macro call graph, and, when the initial state of any entry points is changed, reevaluating only the sub-call-graphs that have at least a path from the changed entry points in the macro call graph.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
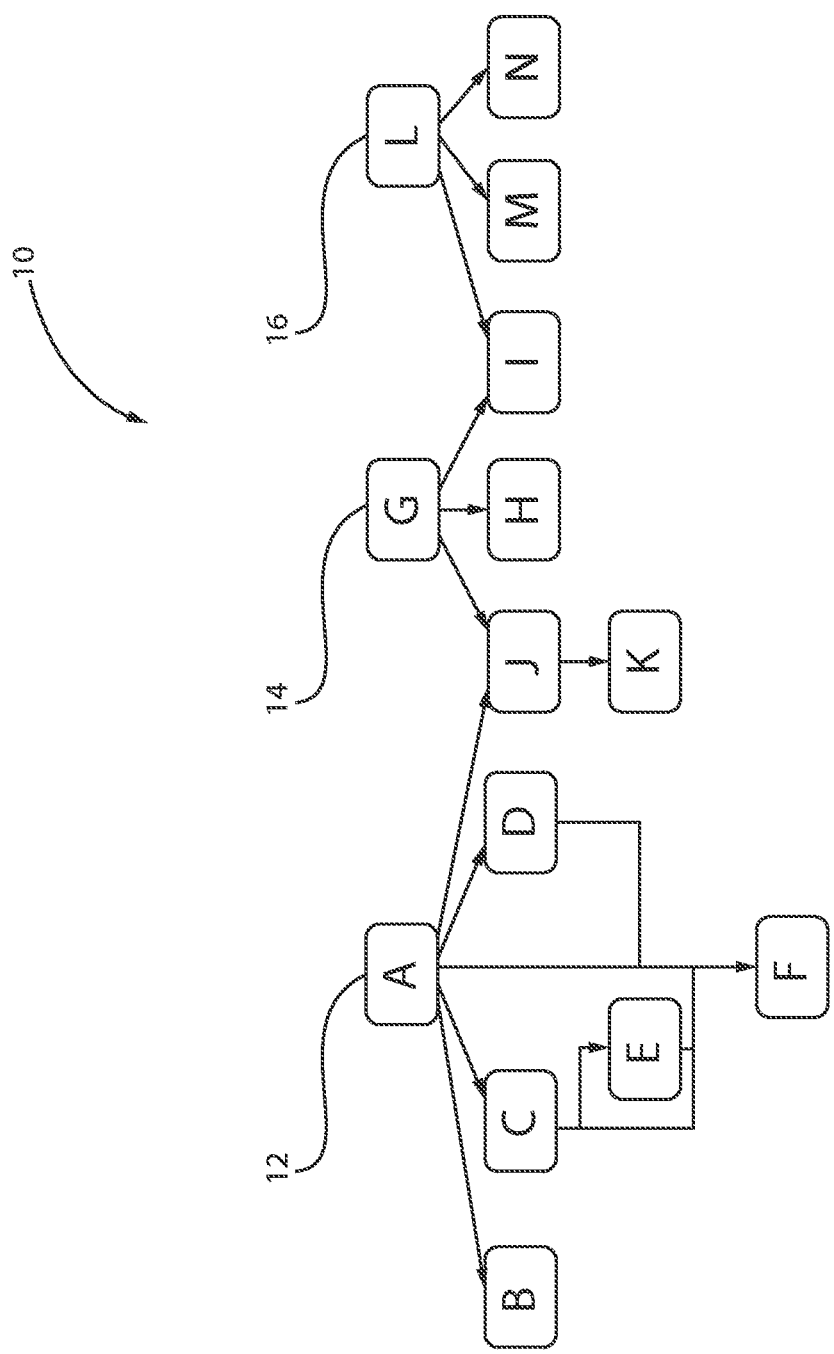
FIG. 1 is a block/flow diagram of an exemplary call graph of input programs, in accordance with an embodiment of the present invention.

FIG. 1 is a block/flow diagram of an exemplary call graph of input programs, in accordance with an embodiment of the present invention.

The call graph 10 illustrates an example of a program call graph whose node represents a program and whose edge represents a call from a program to another program. It has 14 programs named from A to N, and three entry points 12, 14, 16. Entry point 12 is the entry point calling the program A to start the application, entry point 14 is the entry point calling the program "G," and entry point 16 is the entry point calling the program "L." In the graph, there are 5 paths from the entry point 12, that is, A-B, A-C-E-F, A-C-F, A-D-F, and A-J-K, 3 paths from the entry point 14, that is, G-J-K, G-H, and G-I, and 3 paths from the entry point 16, that is, L-I, L-M, and L-N.

Figure 2:
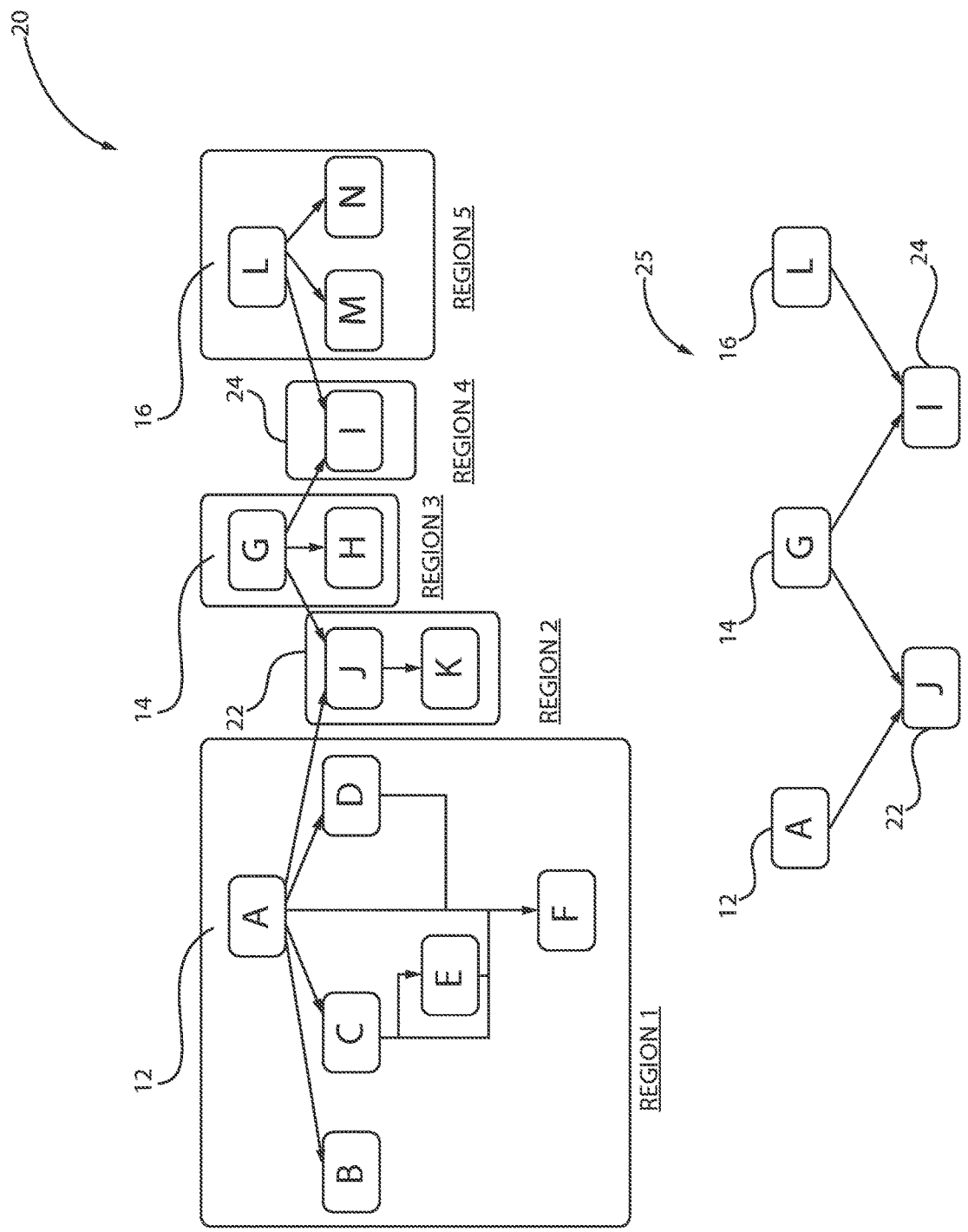
FIG. 2 is a block/flow diagram of exemplary sub-call-graphs separated by merge points, in accordance with an embodiment of the present invention.

FIG. 2 is a block/flow diagram of exemplary sub-call-graphs separated by merge points, in accordance with an embodiment of the present invention.

In graph 20, two merge points are detected, that is, first merge point 22 (pertaining to J) and second merge point 24 (pertaining to I). At J, the paths of A-J-K from the entry point 12 and G-J-K from the entry point 14 are merged. At I, the paths of G-I from the entry point 14 and L-I from the entry point 16 are merged. With the detection of the two merged points 22, 24, the call graph 20 is divided into five regions, as illustrated.

Additionally, a corresponding macro call graph 25 is shown illustrating only the entry points 12, 14, 16 and the merge points 22, 24.

Figure 3:
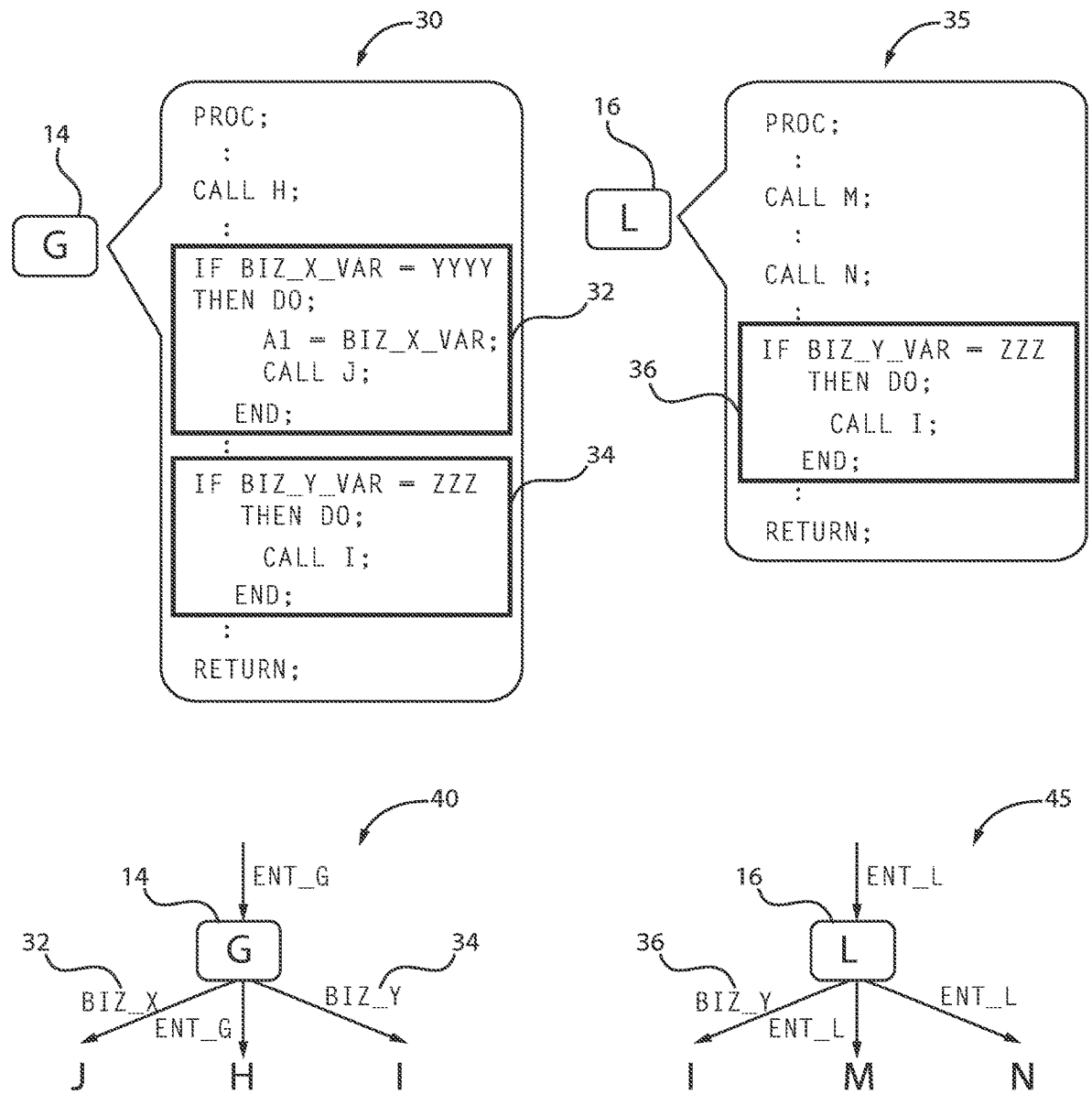
FIG. 3 is a block/flow diagram of exemplary business code area detection, in accordance with an embodiment of the present invention.

FIG. 3 is a block/flow diagram of exemplary business code area detection, in accordance with an embodiment of the present invention.

A first code piece 30 represents a program fragment of the program G and a second code piece 35 represents a program fragment of the program L.

The first code piece 30 includes business code region 32 and business code region 34. The business code region 32 includes variable BIZ_X_VAR and the business code region 34 includes variable BIZ_Y_VAR. The second code piece 35 includes business code region 36. The business code region 36 includes variable BIZ_Y_VAR. The business code regions 32, 34, 36 correspond to specific business logic. BIZ_X_VAR and BIZ_Y_VAR are the variables for business processes "BIZ_X" and "BIZ_Y," respectively. By using dependency analysis, the code regions 32, 34, 36 are detected as the business processes of "BIZ_X" and "BIZ_Y," respectively.

Business processes are assigned to the external calls included in those regions, as shown in graphs 40, 45. Graph 40 depicts the entry edge 14 and the external call edges for the program G. Since the call to the program J, "CALL J," is included in the code area of the business process 32 of BIZ_X, the external call edge 32 from G to J is assigned the business process of BIZ_X. Similarly, the external call edge 34 from G to I is assigned the business process of BIZ_Y because the call, "CALL I," is included in the code area of the business process 34 of BIZ_Y. On the other hand, the external call from G to H is not included in the code area of any business process in the program G, the external call edge from G to H is assigned the same state of the entry point of the program G, ENT_G. Graph 45 depicts the entry edge 16 and the external call edges for the program L. In the same way, the external edge 36 from L to I is assigned the business process of BIZ_Y, and the other two external edges from L to M and from L to N are assigned the same state of the entry point of the program L, ENT_L.

Figure 4:
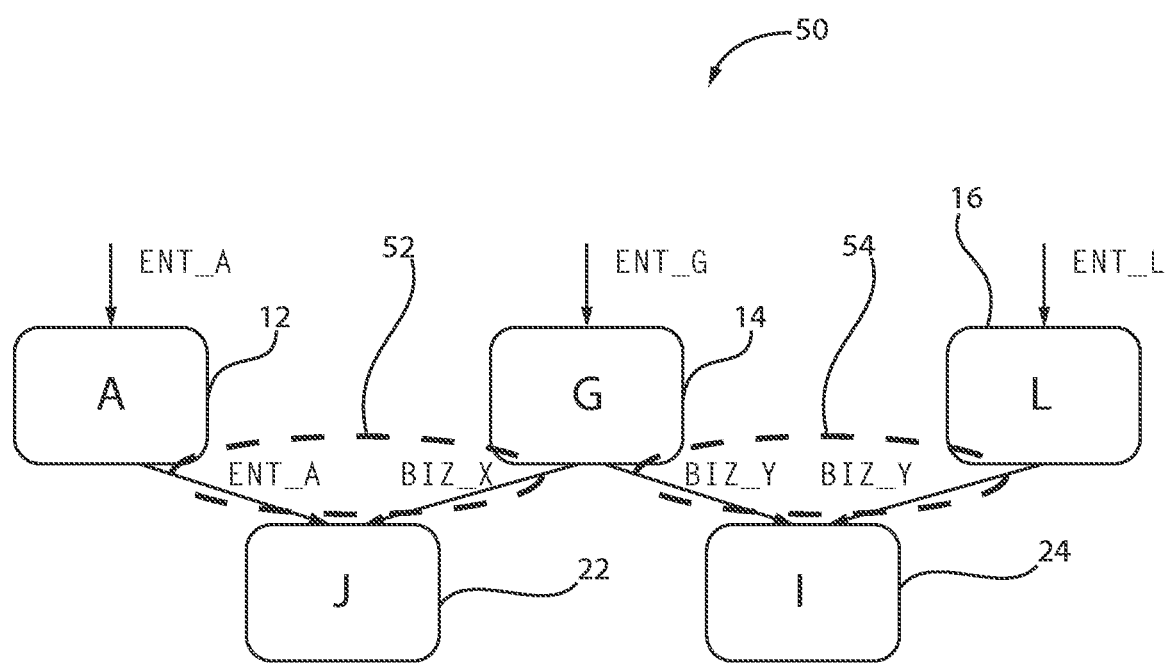
FIG. 4 is a block/flow diagram of exemplary business information propagation, in accordance with an embodiment of the present invention.

FIG. 4 is a block/flow diagram of exemplary business information propagation 50, in accordance with an embodiment of the present invention.

The states of business processes are propagated by using dataflow analysis, and the results are shown in FIG. 4.

The conditions to decide the entry status of each merge point are as follows:

For condition 1, if the states reached from all the entry edges are the same, the state is assigned to the entry state of the node.

For condition 2, if the states reached from all the entry edges include a "common process" state, the state of "common process" is assigned to the entry state of the node.

For condition 3, if the states reached from all the entry edges don't include any "common process" state, the combination of all the reached states is assigned to the entry state of the node.

For the entry of J, the state of ENT_A and "BIZ_Y" are merged (52), and the resulting state decides what the state ENT_A represents. If ENT_A represents "common process," then the resulting state becomes "common process" according to condition 2. If the state ENT_A represents "BIZ_X," the resulting state becomes "BIZ_X" according to condition 1. If the state ENT_A represents "BIZ_Y," the resulting state becomes the combination of "BIZ_X" and "BIZ_Y" according to condition 3.

For the entry of I, the states of "BIZ_Y" and "BIZ_Y" are merged (54), and the resulting state becomes "BIZ_Y" according to condition 1.

Therefore, the node I (merge point) has the state of "BIZ_Y" as the entry. On the other hand, Node J (merge point) has the state of either "common process," "BIZ_X," or the combination of "BIZ_X" and "BIZ_Y" as the entry 52.

Since the programs in macro node I don't have any code related to any specific business process, all the statements of the programs in node I belong to the business "BIZ_Y". For other programs, the belonging state depends on what state is assigned to the three entries, ENT_A, ENT_G, and ENT_L, except for the program G and L. The program G and L in FIG. 3 include the code region for the specific business process, and the state of those regions doesn't affect the state of the program entry point.

Figure 5:
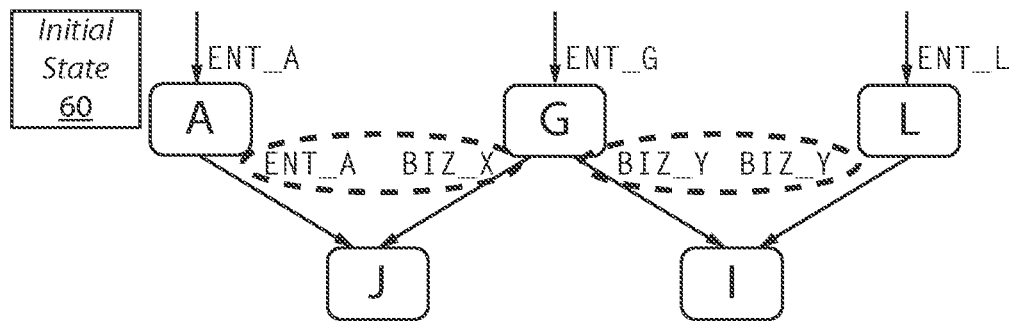
FIG. 5 is a block/flow diagram illustrating states of some entry points being changed to another business process, in accordance with an embodiment of the present invention.
Figure 5:
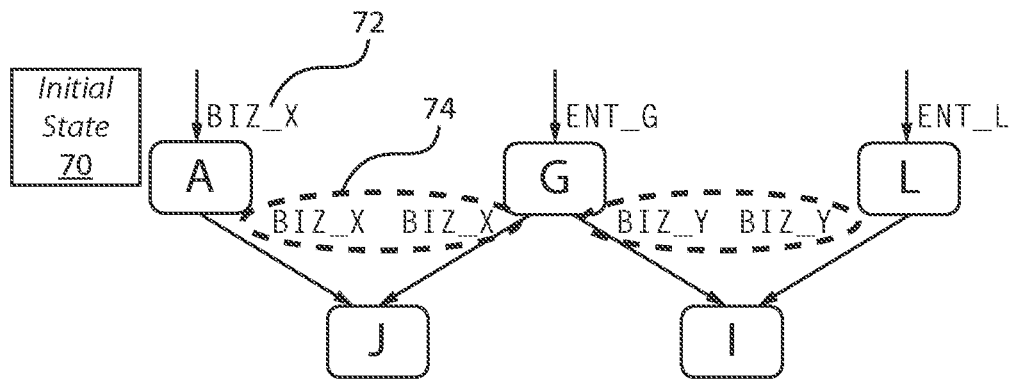
Figure 5:
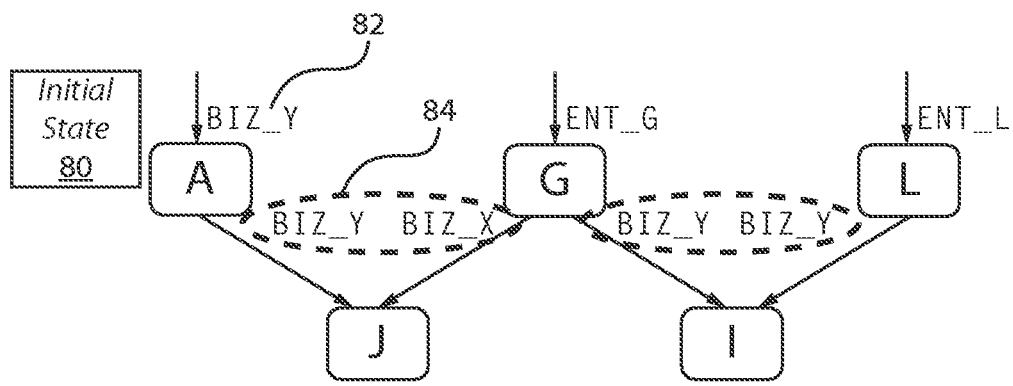

FIG. 5 is a block/flow diagram illustrating states of some entry points being changed to another business process, in accordance with an embodiment of the present invention.

In an initial state 60, the initial states are illustrated with reference to FIGS. 1-4. In other words, there are three entry points 12, 14, 16 and two merge points 22, 24. In this example, "common process" state is assigned to all the entry points.

In case 1, or state 70, the entry state of A is changed to BIZ_X 72.

All the statements in the programs J and K, which are included in the macro node J, become the code for BIZ_X (shown as 74). In addition, the programs A, B, C, D, E, and F, which are included in the macro node A, become the code for BIZ_X (shown as 72).

In case 2, or state 80, the entry state of A is changed to BIZ_Y 82.

All the statements in the programs J and K, which are included in the macro node J, become the code for BIZ_X and BIZ_Y (shown as 84). In addition, the programs A, B, C, D, E, and F, which are included in the macro node A, become the code for BIZ_Y (shown as 82).

Therefore, according to FIGS. 1-5, the exemplary embodiments detect the code region corresponding to each specific business process by dividing the program call-graph for the target application into multiple sub-call-graphs at all the merge points from any entry points, and create a macro call graph based where each node represents a sub-call-graph, generating the initial state of all the entry points and the statements related to the specific business processes from the given information, detecting the code region for each business process by using dataflow analysis applied on each program, each sub-call-graph, and the macro call graph, and, when the initial state of any entry points is changed, reevaluating only the sub-call-graphs that have at least a path from the changed entry points in the macro call graph.

A summary of the implementation example of FIGS. 1-5 is as follows:

At first, a macro call graph is generated by creating a program call graph, detecting all the merge points from any entry points, and creating a macro call graph based on where each node represents a sub-call-graph. Then, specific business code detection in each program is performed by detecting the statements related to the specific business processes from the given information in each program, detecting the code region related to the specific business processes by dependency analysis, and detecting all the external call statements included in the code region related to a business process. The detecting the code region related to the specific business processes includes data dependency analysis and control dependency analysis where, if a detected statement is a conditional branch, it is useful to detect which branches are related to the business and, if a code region of a business process includes the code region for another business process, the resulting code region is solved by using the given information.

Next, the specific business region in each sub-call-graph is detected by setting specific businesses to the output edges from each program based on the results of the detection of all the external call statements included in the code region related to a business process, detecting the region related to the specific business processes by dataflow analysis, and detecting all the external edges outside of the sub-call-graph related to a business process. It is noted that at each merge point, all the entry edge flows of the data are "common process," and the state of the entry thus becomes "common process." Otherwise, the state of the entry is the combination of all the business processes reached at the entry point.

Next, the specific business regions in the macro call graph are detected by setting the initial state in each entry point of the macro call graph, setting specific businesses to the output edges from each node based on the results of detecting all the external edges outside of the sub-call-graph related to a business process, and detecting the region related to the specific business processes by dataflow analysis. It is noted that at each merge point, all the entry edge flows of the data are "common process," and thus the state of the entry becomes "common process." Otherwise, the state of the entry is the combination of all the business processes reached at the entry point.

Finally, code regions corresponding to the specific business processes are detected from the previous results by reflecting the state of each entry point to the sub-call-graphs and the programs.

The advantageous of the exemplary embodiments include at least reducing the analysis cost by dividing the program call graph at the initial analysis time and the update analysis time, when the initial state of any entry points is changed into another business process or common process.

Figure 6:
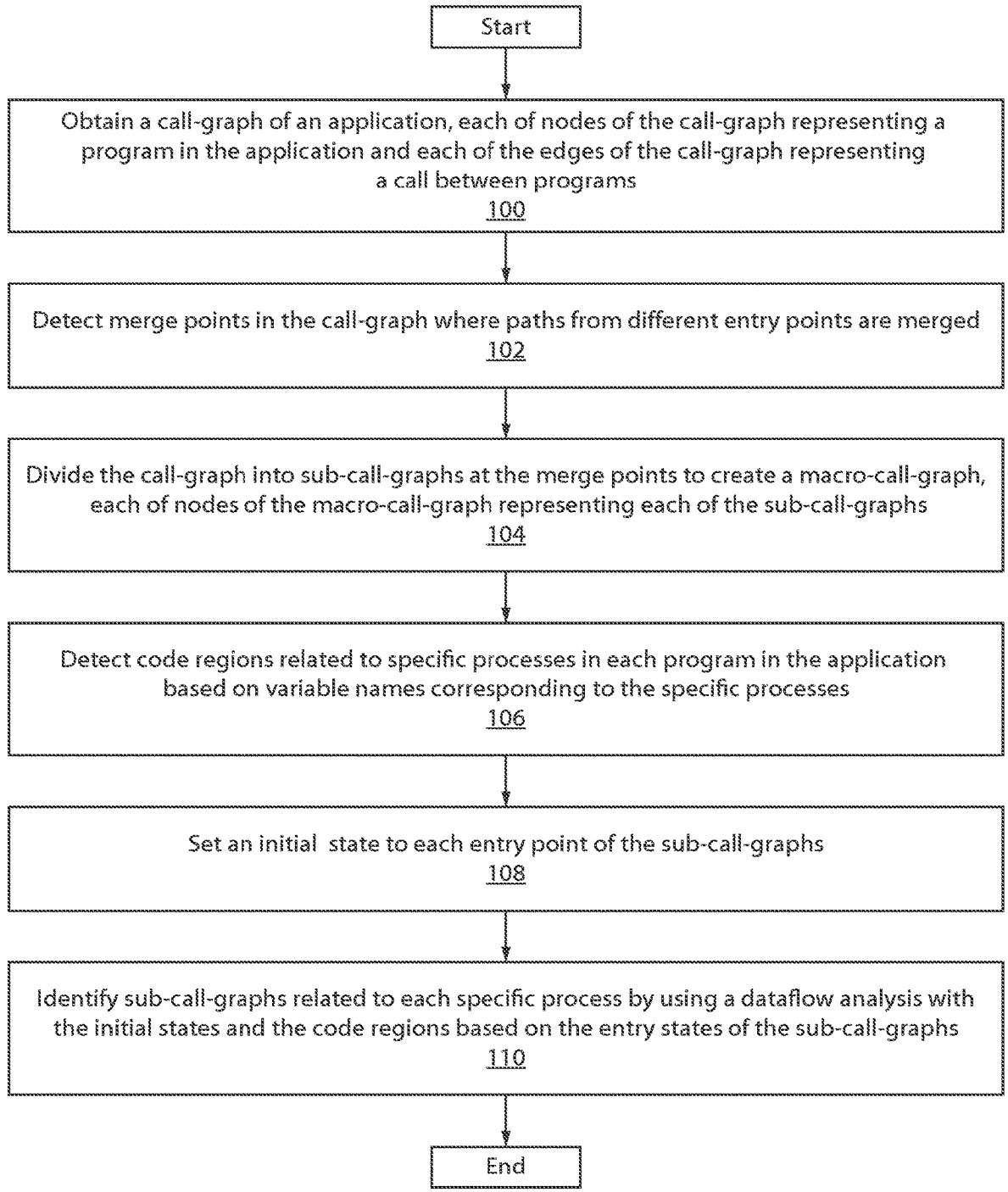
FIG. 6 is a block/flow diagram of an exemplary method for detecting specific business code areas in a mainframe application, in accordance with an embodiment of the present invention.

FIG. 6 is a block/flow diagram of an exemplary method for detecting specific business code areas in a mainframe application, in accordance with an embodiment of the present invention.

At block 100, obtain a call-graph of an application, each of the nodes of the call-graph representing a program in the application and each of the edges of the call-graph representing a call between programs.

At block 102, detect merge points in the call-graph where paths from different entry points are merged.

At block 104, divide the call-graph into sub-call-graphs at the merge points to create a macro-call-graph, each of the nodes of the macro-call-graph representing each of the sub-call-graphs.

At block 106, detect code regions related to specific processes in each program in the application based on variable names corresponding to the specific processes.

At block 108, set an initial state to each entry point of the sub-call-graphs.

At block 110, identify sub-call-graphs related to each specific process by using dataflow analysis with the initial states and the code regions based on the entry states of the sub-call-graphs.

Figure 7:
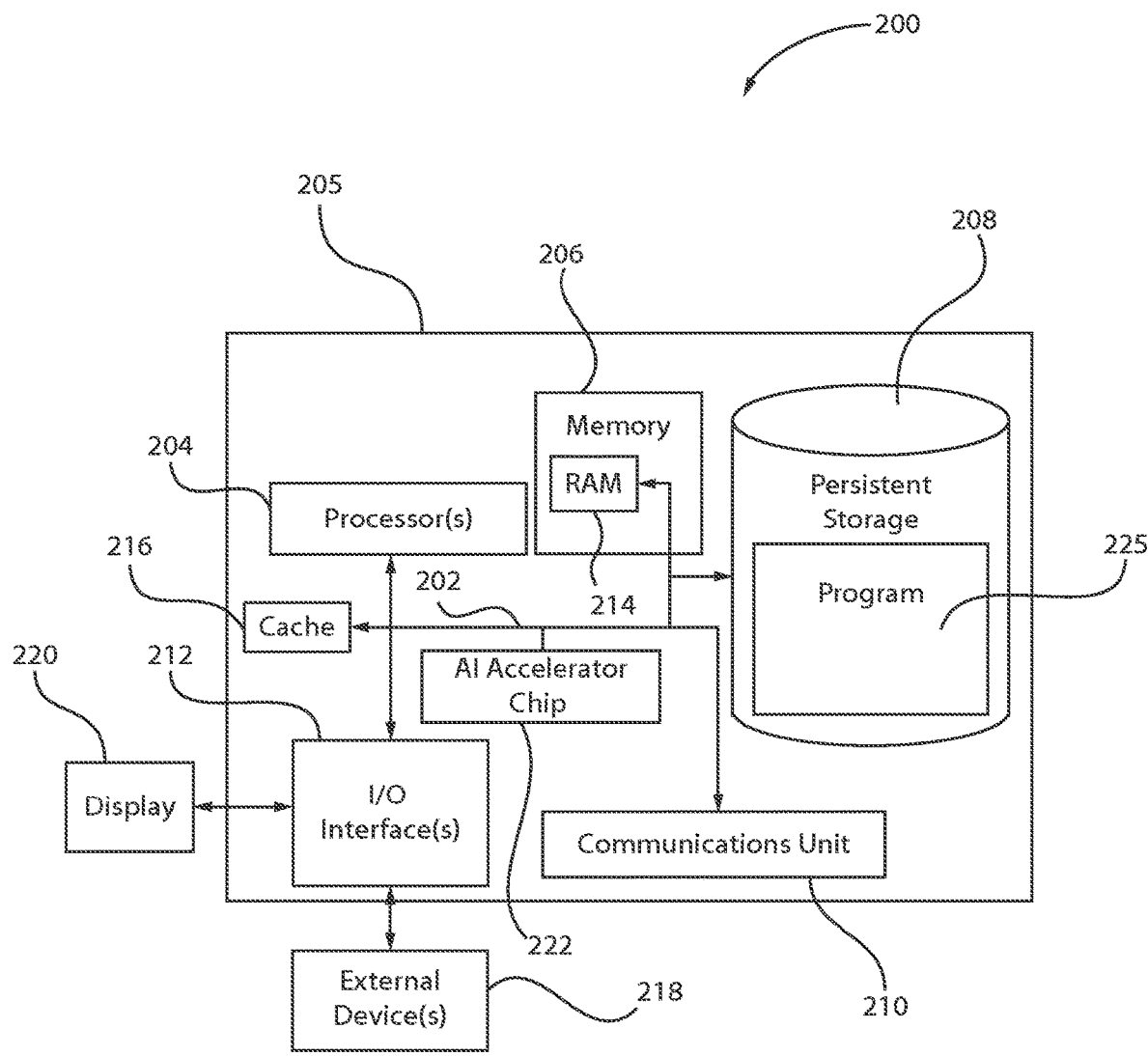
FIG. 7 is a block/flow diagram of an exemplary processing system for detecting specific business code areas in a mainframe application, in accordance with an embodiment of the present invention.

FIG. 7 is a block/flow diagram of an exemplary processing system for detecting specific business code areas in a mainframe application, in accordance with an embodiment of the present invention.

FIG. 7 depicts a block diagram of components of system 200, which includes computing device 205. It should be appreciated that FIG. 7 provides only an illustration of one implementation and does not imply any limitations with regard to the environments in which different embodiments can be implemented. Many modifications to the depicted environment can be made.

Computing device 205 includes communications fabric 202, which provides communications between computer processor(s) 204, memory 206, persistent storage 208, communications unit 210, and input/output (I/O) interface(s) 212. Communications fabric 202 can be implemented with any architecture designed for passing data and/or control information between processors (such as microprocessors, communications and network processors, etc.), system memory, peripheral devices, and any other hardware components within a system. For example, communications fabric 202 can be implemented with one or more buses.

Memory 206, cache memory 216, and persistent storage 208 are computer readable storage media. In this embodiment, memory 206 includes random access memory (RAM) 214. In another embodiment, the memory 206 can be flash memory. In general, memory 206 can include any suitable volatile or non-volatile computer readable storage media.

In some embodiments of the present invention, program 225 is included and operated by AI accelerator chip 222 as a component of computing device 205. In other embodiments, program 225 is stored in persistent storage 208 for execution by AI accelerator chip 222 (to implement code region detection for specific business processes) in conjunction with one or more of the respective computer processors 204 via one or more memories of memory 206. In this embodiment, persistent storage 208 includes a magnetic hard disk drive. Alternatively, or in addition to a magnetic hard disk drive, persistent storage 208 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 208 can also be removable. For example, a removable hard drive can be used for persistent storage 208. Other examples include optical and magnetic disks, thumb drives, and smart cards that are inserted into a drive for transfer onto another computer readable storage medium that is also part of persistent storage 208.

Communications unit 210, in these examples, provides for communications with other data processing systems or devices, including resources of distributed data processing environment. In these examples, communications unit 210 includes one or more network interface cards. Communications unit 210 can provide communications through the use of either or both physical and wireless communications links. Deep learning program 225 can be downloaded to persistent storage 208 through communications unit 210.

I/O interface(s) 212 allows for input and output of data with other devices that can be connected to computing system 200. For example, I/O interface 212 can provide a connection to external devices 218 such as a keyboard, keypad, a touch screen, and/or some other suitable input device. External devices 218 can also include portable computer readable storage media such as, for example, thumb drives, portable optical or magnetic disks, and memory cards.

Display 220 provides a mechanism to display data to a user and can be, for example, a computer monitor.

Figure 8:
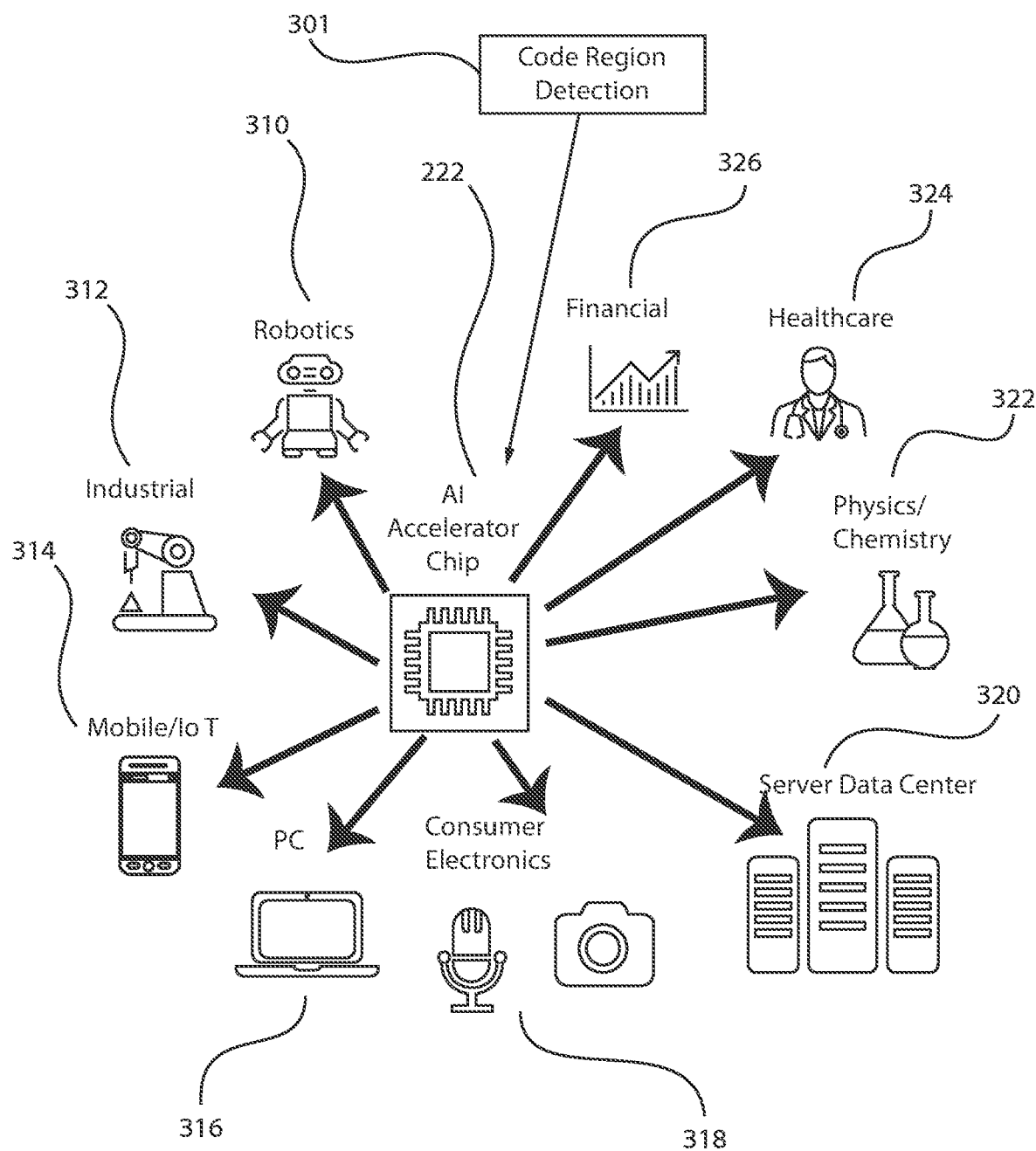
FIG. 8 illustrates practical applications for specific business code area detection in a mainframe application via an artificial intelligence (AI) accelerator chip, in accordance with an embodiment of the present invention.

FIG. 8 illustrates practical applications for specific business code area detection in a mainframe application via an artificial intelligence (AI) accelerator chip, in accordance with an embodiment of the present invention.

The artificial intelligence (AI) accelerator chip 222 can implement the code region detection 301, and can be used in a wide variety of practical applications, including, but not limited to, robotics 310, industrial applications 312, mobile or Internet-of-Things (IoT) 314, personal computing 316, consumer electronics 318, server data centers 320, physics and chemistry applications 322, healthcare applications 324, and financial applications 326.

Figure 9:
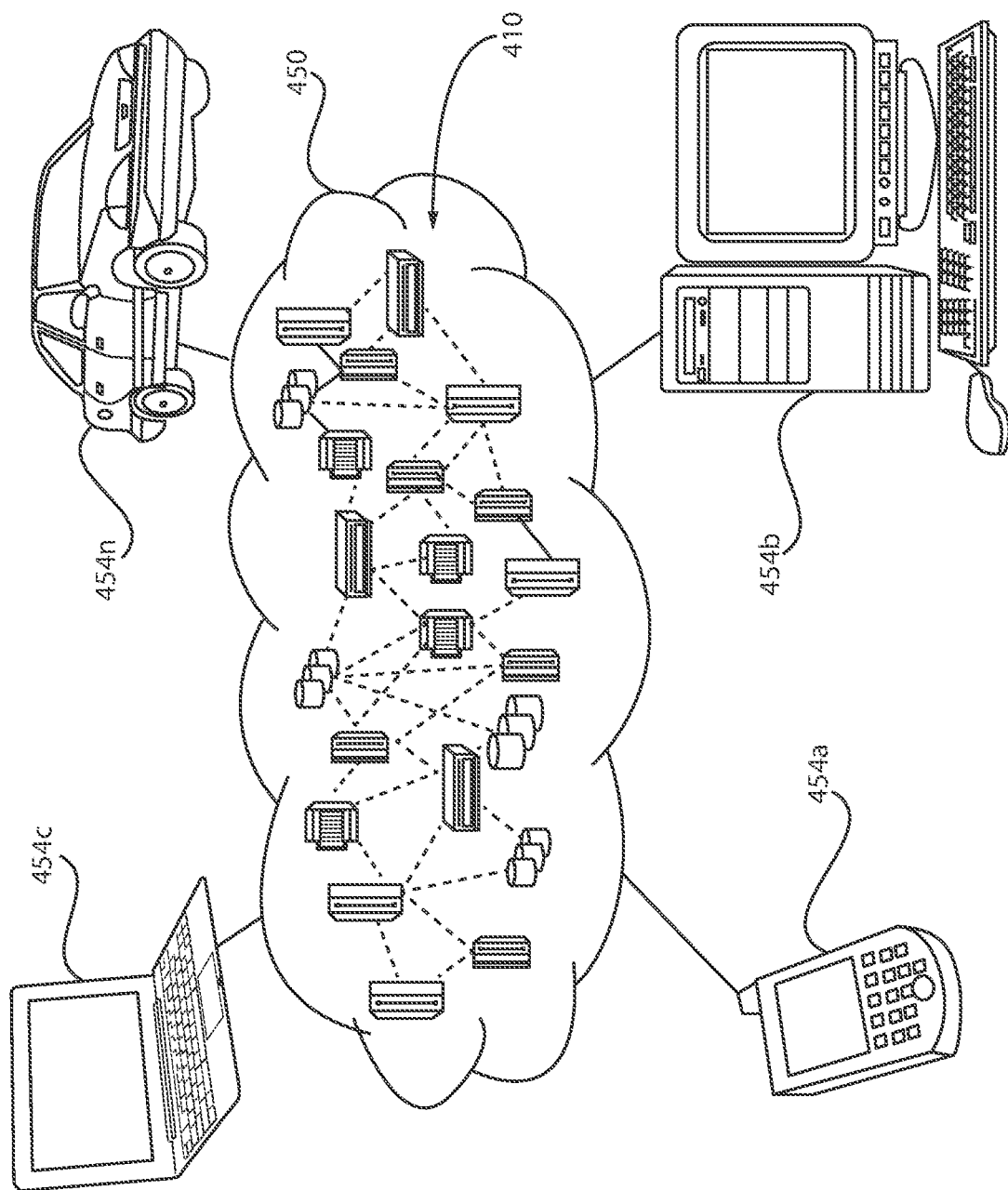
FIG. 9 is a block/flow diagram of an exemplary cloud computing environment, in accordance with an embodiment of the present invention.

FIG. 9 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 450 is depicted for enabling use cases of the present invention. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N can communicate. Nodes 410 can communicate with one another. They can be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 9 are intended to be illustrative only and that computing nodes 410 and cloud computing environment 450 can communicate with any type of computerized device over any type of network and/or network addressable connection (e.g., using a web browser).

Figure 10:
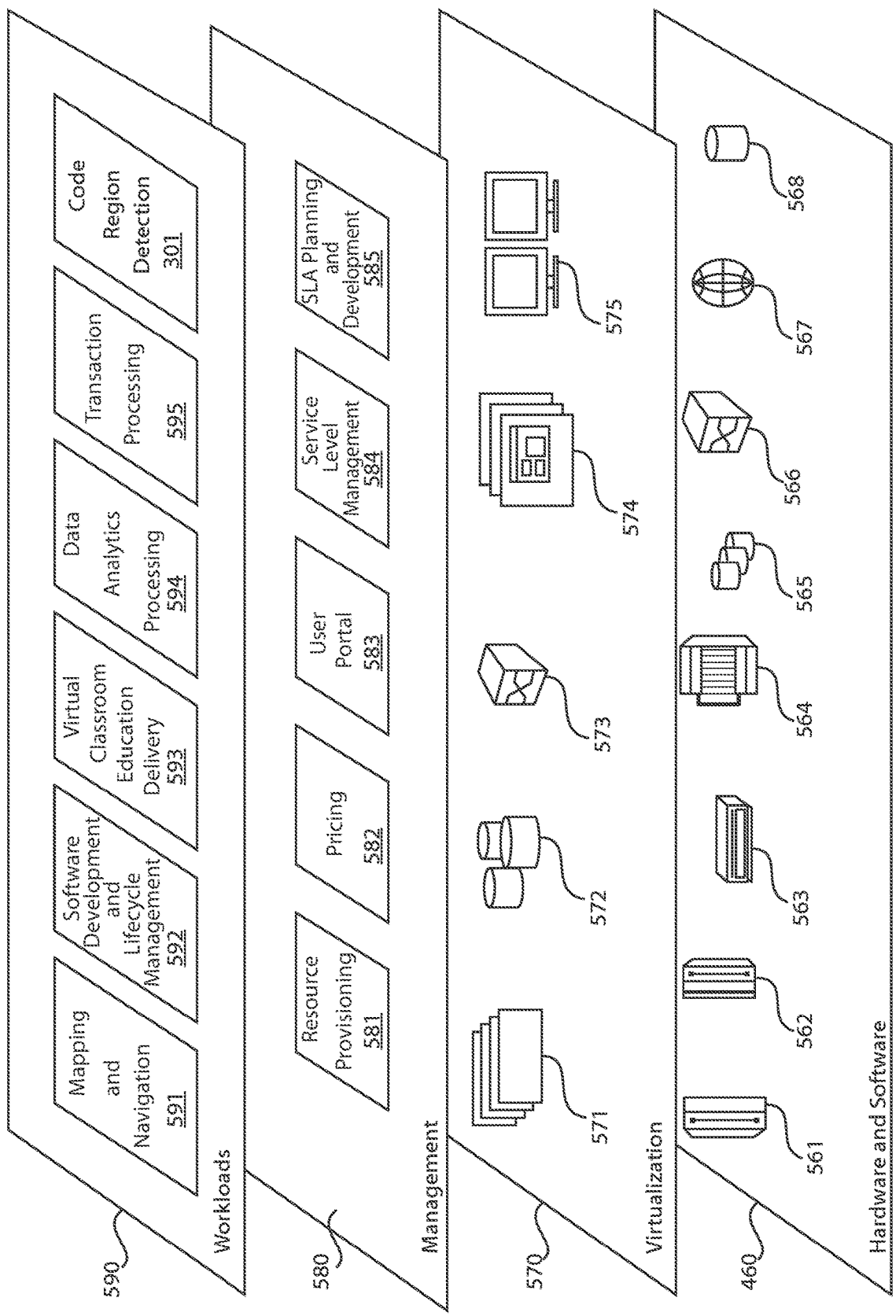
FIG. 10 is a schematic diagram of exemplary abstraction model layers, in accordance with an embodiment of the present invention.

FIG. 10 is a schematic diagram of exemplary abstraction model layers, in accordance with an embodiment of the present invention. It should be understood in advance that the components, layers, and functions shown in FIG. 10 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities can be provided: virtual servers 571; virtual storage 572; virtual networks 573, including virtual private networks; virtual applications and operating systems 574; and virtual clients 575.

In one example, management layer 580 can provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment can be utilized. Examples of workloads and functions which can be provided from this layer include: mapping and navigation 541; software development and lifecycle management 592; virtual classroom education delivery 593; data analytics processing 594; transaction processing 595; and code region detection 301.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory, a read-only memory, an erasable programmable read-only memory (EPROM or Flash memory), a static random access memory, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a method for detecting specific business code areas in a mainframe application (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for detecting code regions related to specific business processes in an application, the method comprising:
obtaining a call-graph of an application, each node of the call-graph representing a program in the application and each edge of the call-graph representing a call between programs;
detecting merge points in the call-graph where paths from different entry points are merged;
dividing the call-graph into sub-call-graphs at the merge points to create a macro-call-graph, each node of the macro-call-graph representing each of the sub-call-graphs;
detecting and collectively displaying code regions representing program fragments of each of the different entry points corresponding to specific business logic related to specific business processes in each program in the application based on variable names corresponding to the specific business processes;
setting an initial state to each entry point of the sub-call-graphs; and
identifying sub-call-graphs related to each specific business process by using dataflow analysis with the initial states and the code regions based on entry states of the sub-call-graphs to reduce an analysis cost by dividing the call-graph at an initial analysis time and at an update analysis time when the initial state of each of the entry points is changed into another business process.

2. The computer-implemented method of claim 1, further comprising, when the initial state of the entry point of the sub-call-graph is changed, performing the setting and identifying steps for the sub-call-graphs which are on a path from the changed entry point in the macro-call-graph.

3. The computer-implemented method of claim 1, wherein the code regions are detected by dependency analysis.

4. The computer-implemented method of claim 1, wherein the business processes are assigned to external calls.

5. The computer-implemented method of claim 4, wherein the business processes are propagated by using the dataflow analysis.

6. The computer-implemented method of claim 5, wherein a condition to decide entry status of each merge point includes, if states reached from all entry edges are same, a state is assigned to an entry state of a node.

7. The computer-implemented method of claim 5, wherein a condition to decide entry status of each merge point includes, if states reached from all entry edges include a common process state, a state of common process is assigned to an entry state of a node.

8. A computer program product for detecting code regions related to specific business processes in an application, the computer program product comprising a computer readable storage medium having program instructions embodied therewith, the program instructions executable by a computer to cause the computer to:
obtain a call-graph of an application, each node of the call-graph representing a program in the application and each edge of the call-graph representing a call between programs;
detect merge points in the call-graph where paths from different entry points are merged;
divide the call-graph into sub-call-graphs at the merge points to create a macro-call-graph, each node of the macro-call-graph representing each of the sub-call-graphs;
detect and collectively display code regions representing program fragments of each of the different entry points corresponding to specific business logic related to specific business processes in each program in the application based on variable names corresponding to the specific business processes;
set an initial state to each entry point of the sub-call-graphs; and
identify sub-call-graphs related to each specific business process by using dataflow analysis with the initial states and the code regions based on entry states of the sub-call-graphs to reduce an analysis cost by dividing the call-graph at an initial analysis time and at an update analysis time when the initial state of each of the entry points is changed into another business process.

9. The computer program product of claim 8, wherein, when the initial state of the entry point of the sub-call-graph is changed, the setting and identifying steps are performed for the sub-call-graphs which are on a path from the changed entry point in the macro-call-graph.

10. The computer program product of claim 8, wherein the code regions are detected by dependency analysis.

11. The computer program product of claim 8, wherein the business processes are assigned to external calls.

12. The computer program product of claim 11, wherein the business processes are propagated by using the dataflow analysis.

13. The computer program product of claim 12, wherein a condition to decide entry status of each merge point includes, if states reached from all entry edges are same, a state is assigned to an entry state of a node.

14. The computer program product of claim 12, wherein a condition to decide entry status of each merge point includes, if states reached from all entry edges include a common process state, a state of common process is assigned to an entry state of a node.

15. A system for detecting code regions related to specific business processes in an application, the system comprising:
   a memory; and
   one or more processors in communication with the memory configured to:
      obtain a call-graph of an application, each node of the call-graph representing a program in the application and each edge of the call-graph representing a call between programs;
      detect merge points in the call-graph where paths from different entry points are merged;
      divide the call-graph into sub-call-graphs at the merge points to create a macro-call-graph, each node of the macro-call-graph representing each of the sub-call-graphs;
      detect and collectively display code regions representing program fragments of each of the different entry points corresponding to specific business logic related to specific business processes in each program in the application based on variable names corresponding to the specific business processes;
      set an initial state to each entry point of the sub-call-graphs; and
      identify sub-call-graphs related to each specific business process by using dataflow analysis with the initial states and the code regions based on entry states of the sub-call-graphs to reduce an analysis cost by dividing the call-graph at an initial analysis time and at an update analysis time when the initial state of each of the entry points is changed into another business process.

16. The system of claim 15, wherein, when the initial state of the entry point of the sub-call-graph is changed, the setting and identifying steps are performed for the sub-call-graphs which are on a path from the changed entry point in the macro-call-graph.

17. The system of claim 15, wherein the code regions are detected by dependency analysis.

18. The system of claim 15, wherein the business processes are propagated by using the dataflow analysis.

19. The system of claim 18, wherein a condition to decide entry status of each merge point includes, if states reached from all entry edges are same, a state is assigned to an entry state of a node.

20. The system of claim 18, wherein a condition to decide entry status of each merge point includes, if states reached from all entry edges include a common process state, a state of common process is assigned to an entry state of a node.

* * * * *